US008185472B1

(12) United States Patent
Boyd et al.

(10) Patent No.: US 8,185,472 B1
(45) Date of Patent: May 22, 2012

(54) ENROLLMENT INTO AN ONLINE BANKING SYSTEM (75) Inventors: Sabrena Boyd, Charlotte, NC (US);
Ioanis Nikolaou, Charlotte, NC (US);
Jessica Brandt, Hunterville, NC (US);
James Ashfield, Charlotte, NC (US);
Karen Choy, San Francisco, CA (US);
Eric Miller, Issaquah, WA (US); Carrie Sumlin, Charlotte, NC (US); Tanja Castor, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 12/141,259

(22) Filed: Jun. 18, 2008

(51) Int. Cl.
*G06Q 40/00* (2012.01)
(52) U.S. Cl. .......................................... 705/43
(58) Field of Classification Search .............. 705/35–45
See application file for complete search history.

(56) References Cited

U.S. PATENT DOCUMENTS

| | | | | |
|---|---|---|---|---|
| 5,220,501 A * | 6/1993 | Lawlor et al. | ................... | 705/40 |
| 5,870,724 A * | 2/1999 | Lawlor et al. | ................... | 705/42 |
| 6,073,119 A * | 6/2000 | Bornemisza-Wahr et al. | . | 705/42 |
| 6,609,113 B1 | 8/2003 | O'Leary et al. | | |
| 6,760,414 B1 | 7/2004 | Schurko et al. | | |
| 7,076,458 B2 * | 7/2006 | Lawlor et al. | ................... | 705/35 |
| 7,444,672 B2 * | 10/2008 | Ellmore | .............. | 726/8 |
| 7,844,519 B2 * | 11/2010 | Wehunt et al. | .................. | 705/35 |
| 7,849,003 B2 * | 12/2010 | Egnatios et al. | ................ | 705/38 |
| 7,885,870 B2 * | 2/2011 | Nam et al. | ....................... | 705/35 |
| 7,949,603 B1 * | 5/2011 | Cao et al. | ......................... | 705/45 |
| 8,086,508 B2 * | 12/2011 | Dheer et al. | ..................... | 705/35 |
| 2004/0148259 A1 * | 7/2004 | Reiners et al. | ................... | 705/42 |
| 2004/0215564 A1 * | 10/2004 | Lawlor et al. | ................... | 705/40 |
| 2004/0267664 A1 * | 12/2004 | Nam et al. | ....................... | 705/41 |
| 2004/0267665 A1 * | 12/2004 | Nam et al. | ....................... | 705/41 |
| 2005/0097046 A1 * | 5/2005 | Singfield | ......................... | 705/42 |
| 2005/0160019 A1 * | 7/2005 | Cluse et al. | ...................... | 705/35 |
| 2006/0036487 A1 * | 2/2006 | Mann | .............................. | 705/14 |
| 2006/0116949 A1 * | 6/2006 | Wehunt et al. | .................. | 705/35 |
| 2006/0172275 A1 * | 8/2006 | Cohen | ........................... | 434/350 |
| 2006/0182258 A1 * | 8/2006 | Sisselman et al. | ........ | 379/265.02 |
| 2007/0136167 A1 * | 6/2007 | Dilip et al. | ....................... | 705/35 |
| 2007/0174080 A1 | 7/2007 | Outwater | | |
| 2007/0219865 A1 * | 9/2007 | Leining | ........................... | 705/14 |
| 2008/0059372 A1 * | 3/2008 | Lee et al. | ......................... | 705/41 |
| 2008/0091593 A1 * | 4/2008 | Egnatios et al. | ................ | 705/39 |
| 2008/0091600 A1 * | 4/2008 | Egnatios et al. | ................ | 705/42 |
| 2008/0242274 A1 * | 10/2008 | Swanburg et al. | .......... | 455/414.1 |
| 2009/0259537 A1 * | 10/2009 | Veksler et al. | ................... | 705/14 |

OTHER PUBLICATIONS

American Express, Financial Services, Online banking website, Mar. 2003.*

(Continued)

*Primary Examiner* — Ella Colbert
*Assistant Examiner* — Mohammad Z Shaikh
(74) *Attorney, Agent, or Firm* — Banner & Witcoff, Ltd.; Michael A. Springs (57) ABSTRACT

A method and system employed to enroll a customer into an online banking system. In one example, a customer may submit enrollment information and may request a customer identification name and passcode. In response, an online banking profile may be created and logged into for the customer, and a demonstration on how to use the features of the online banking service may be launched. After completing the demonstration, the customer's online banking session may be logged off.

21 Claims, 6 Drawing Sheets

OTHER PUBLICATIONS

HSBC, "Internet Banking Demonstration", webpage, Jan 12, 2008.*

BB&T Online : "View Online Banking Demo", Aug. 30, 2007, pp. 1-8.*

"Your employees can play an important role in signing up new Internet bill pay customers", Anonymous, Employee Sales Contests & Incentive Plans for Financial Institutions, Storm Lake: Mar. 2005. vol. 3, Iss. 7; p. 3.*

"Fisery Announces Paytraxx Adoption Marketing Program with Online Tutorial", Anonymous, Business Wire. New York: Nov. 28, 2007., herein Paytraxx.*

Internet Archive: Wayback Machine: Aug. 30, 2007, http://online.bbtandt.com/online/bbt01bext/enroll/info?enroll=new.*

Internet Archive: Wayback Machine: May 14, 2008, http://web.archive.org/web/20080514070501/http://www.bbt.com/bbt/flash/on, pp. 1-9.*

"Fisery Announces Paytraxx Adoption Marketing Program with Online Tutorial", Anonymous, Business Wire, New York: Nov. 28, 2007., pp. 1-4.*

Birkwood, Randall, "Recruiter Incentives: Are They Helping or Harming Clients?", ERE.net, Nov. 8, 2005, pp. 1-12.*

"Dubai Bank launches new website with expanded features and security", Middle East Company News.Dubai: Dec. 27, 2007, p. 1.*

Stoneman, Bill, "Branch Personnel Lead Customers to the Web", American Banker. New York: N.Y.: Nov. 22, 2002, vol. 167, Iss. 25; p. 1.*

American Express, Financial Services, Online banking website, Mar. 2003, pp. 1-5.*

Internet Archive: Wayback Machine: Aug. 30, 2007, http://online.bbtandt.com/online/bbt01 bext/enroll/info?enroll=new.*

Petersen, Chris, "Bill Payment", Bank News. Kansas City: Feb. 2005. vol. 105, Iss. 2; p. 20, 3 pgs.*

Furnell, Steve, "A comparison of website user authentication mechanisms", Computer Fraud & Security, Sep. 2007, pp. 1-5.*

Richardson, Leisha, "Online Account Opening: A Tool for Organic Growth", Internet Banking Commentary. Austin: Mar. 2008. vol. 8, iss. 3; p. 4.*

Hazard, Carol, "Beefing up online banking by tomorrow:By tomorrow, banks must have plan for security enhancements", Knight Ridder Tribune Business News. Washington: Dec. 30, 2006. p. 1.*

HSBC, "Internet Banking Demonstration", webpage, Jan. 12, 2008, pp. 1-9.*

* cited by examiner

ENROLLMENT INTO AN ONLINE BANKING SYSTEM

BACKGROUND

Online banking service allows bank customers to conveniently handle banking matters that previously would have required the customer to visit an automated teller machine (ATM) or a brick-and-mortar banking center. While an online banking service may offer great benefits of convenience to the customer, the enrollment process may leave more to be desired. For example, some enrollment processes may involve multiple systems and may be difficult to navigate or organize. In addition, some online banking enrollment processes may be part of one or more larger systems. As such, errors and delays may occur in the enrollment process frustrating potential customers.

In addition, while the online banking service offers many features, each available feature to the customer may be another process or procedure that the customer may need to learn in order to use the online banking service properly. In fact, because it may be days or weeks between when the customer learns how to use the online banking service and when the customer actually uses the online banking service, a customer may have difficulty in remembering how the service works.

From a financial institution's point of view, agents might not be selling the benefits of online banking service sufficiently such that the customer engages in online banking services. For example, some agents may be too verbose in describing the product, therefore quickly losing the attention of the customer. Other agents might not be giving a full explanation of how the online banking service works and the benefits that the service provides, and as a result, the customer fails to understand and/or appreciate the online banking service. In another example, the enrollment process spans multiple platforms and systems such that the process may have multiple opportunities to stall at different points in the process.

While customers may already be able to enroll into an online banking service, many customers choose not enroll for one or more reasons set forth above.

BRIEF SUMMARY

This summary is provided to introduce a selection of concepts in a simplified form that are further described in the Detailed Description. The summary is not intended to identify key features or essential features of the claimed subject matter, nor is it intended to limit the scope of the claimed subject matter.

In one aspect, a customer may enroll into an online banking service by participating in a two-phase initial enrollment session where the first phase may include providing customer account information, creating a customer identification name and passcode, and receiving confirmation of the creation of the online banking access. The second phase may include logging on to the customer's online banking profile with the created identification and passcode, and receive a tutorial on how to use the online banking system while the customer is logged into the customer's account during the initial enrollment session. The customer may also be able to set the customer's account preferences during the initial enrollment session.

In another aspect, a bank agent may initiate the customer enrollment process, walk the customer through an online banking tutorial, and the bank agent may receive incentive credit for doing so before the customer logs out of the customer's online banking session for the first time.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
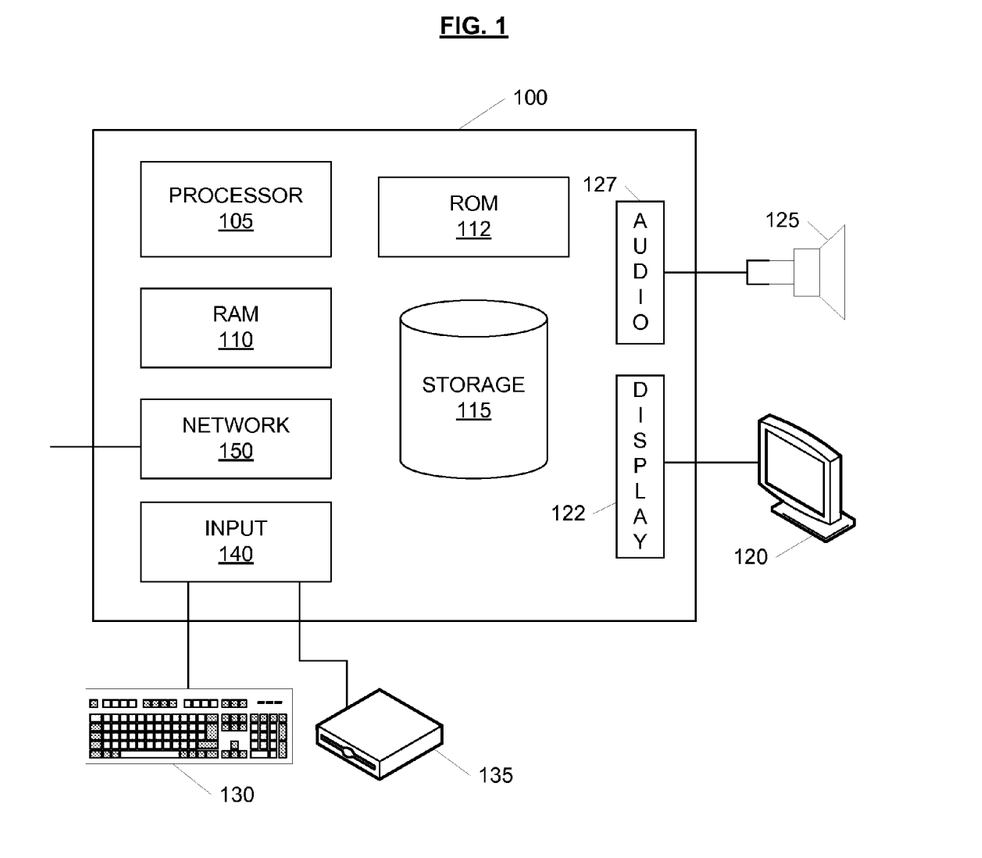
FIG. 1 illustrates a computing environment in which one or more illustrative aspects described herein may be implemented.

FIG. 1 illustrates a computing environment in which one or more aspects described herein may be implemented. A computing device such as computer 100 may house a variety of components for inputting, outputting, storing and processing data. Computer 100 may include desktop computers, laptop computers, ultra mobile PCs, servers and the like. Processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the processor 105 is executing the application.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example, adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
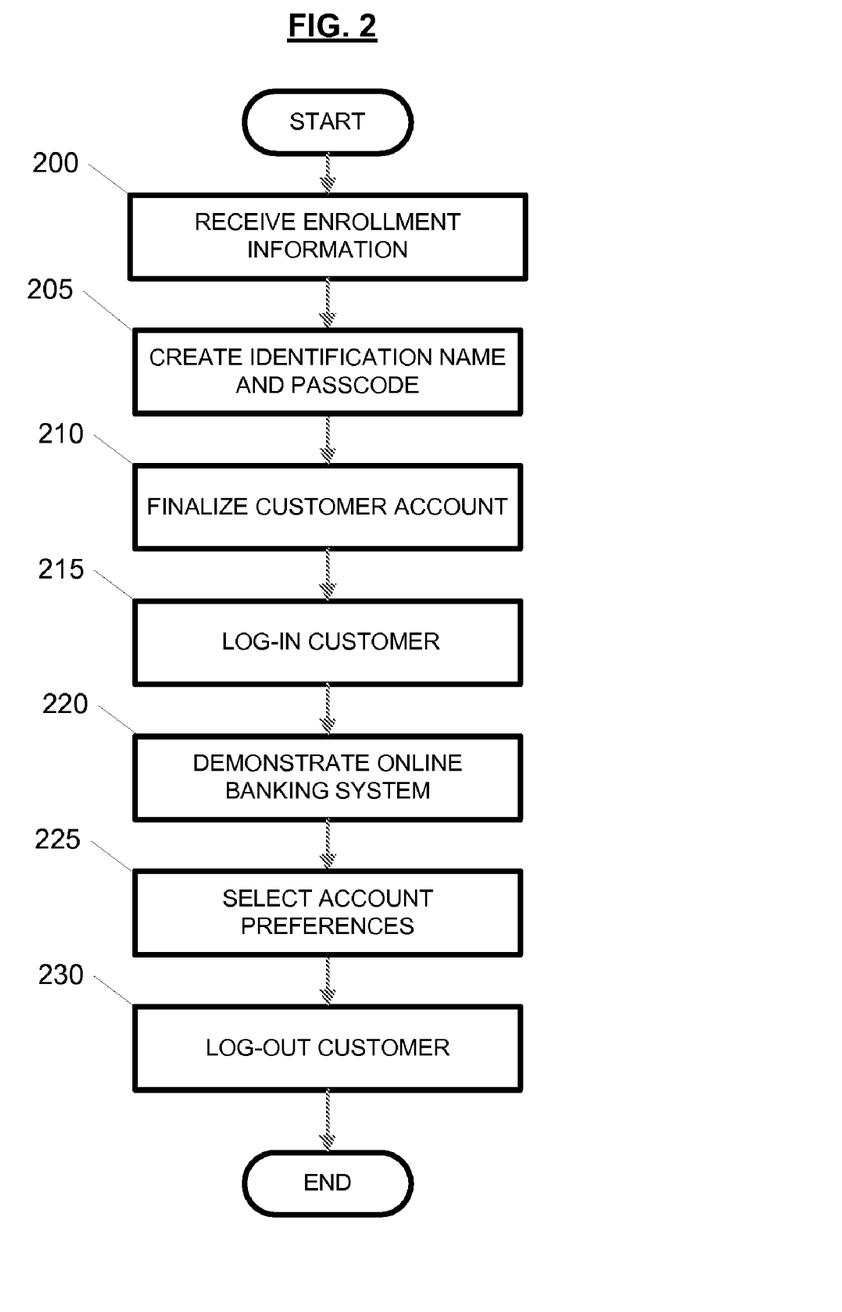
FIG. 2 is a flow chart of an illustrative method of enrolling a customer into an online banking system.

According to an aspect of the invention, a customer may enroll for an online bank account at an agent workstation, bank kiosk, via a computer connected to the internet, a mobile device such as a cellular phone, at an ATM or any other device which may be able to receive and transmit information. FIG. 2 is a flow chart of an illustrative method of enrolling a customer into an online banking system. Computer 100 of FIG. 1 may be utilized to implement some or all of the steps of FIG. 2. Referring to FIG. 2, computer 100 (of FIG. 1) may execute a method of enrolling a customer into an online banking system. At step 200, computer 100 may receive information related to the enrollment of a customer into the online banking system via a graphical user interface (GUI). The information may include, for example, name, address social security number, phone number, account information for the various accounts the customer may have with the financial institution, and the like. In one aspect, the interface may be part of a website operated by the financial institution.

Referring back to FIG. 2, at step 205, computer 100 may assist the customer in creating a customer identification name and a passcode. The customer identification name and passcode may be requested by the online banking system every time the customer wishes to log-in to the customer's online banking profile. The identification name and passcode may be used in tandem to identify the correct account corresponding to the customer and to ensure that unauthorized users might not be able to access the customer's one or more accounts within online banking. Other security and authentication measures may also be used, e.g., as required by existing laws, rules, and regulations of the banking industry.

The customer identification name may be, for example, a unique combination of letters and numbers which may be used by the customer or financial institution to identify the customer and the customer's corresponding online banking profile. In one aspect, the customer identification name may be chosen by the customer at the time of enrollment. In another aspect, the name may be pre-determined. For example, the customer identification name may be the customer's first and last name along with the customer's birthday (e.g., firstlastMMDDYYYY).

The passcode may be, for example, a password or a random combination of alphanumeric characters and may further be subject to other criteria (e.g., the passcode may not contain the customer's name or birth date). In one aspect, the passcode may be chosen by the customer. In another aspect, the passcode may be pre-determined. For example, the passcode may be a random combination of letters and numbers. For security purposes, the passcode might not contain any words or numbers of significance (e.g., the customer's name, birthday, social security number, and the like).

At step 210, computer 100 may finalize creation of the customer account. In one aspect, an email or text message may be sent to an email address provided by the customer during the enrollment process with customer account creation notification.

At step 215, upon finalization of the online account creation, the customer may be logged into the customer's online account for the first time. In one configuration, the customer may be automatically logged in to the customer's account following the creation of the customer's passcode and identification. In another configuration, the customer may be prompted to log-in to the customer's account.

Figure 4:
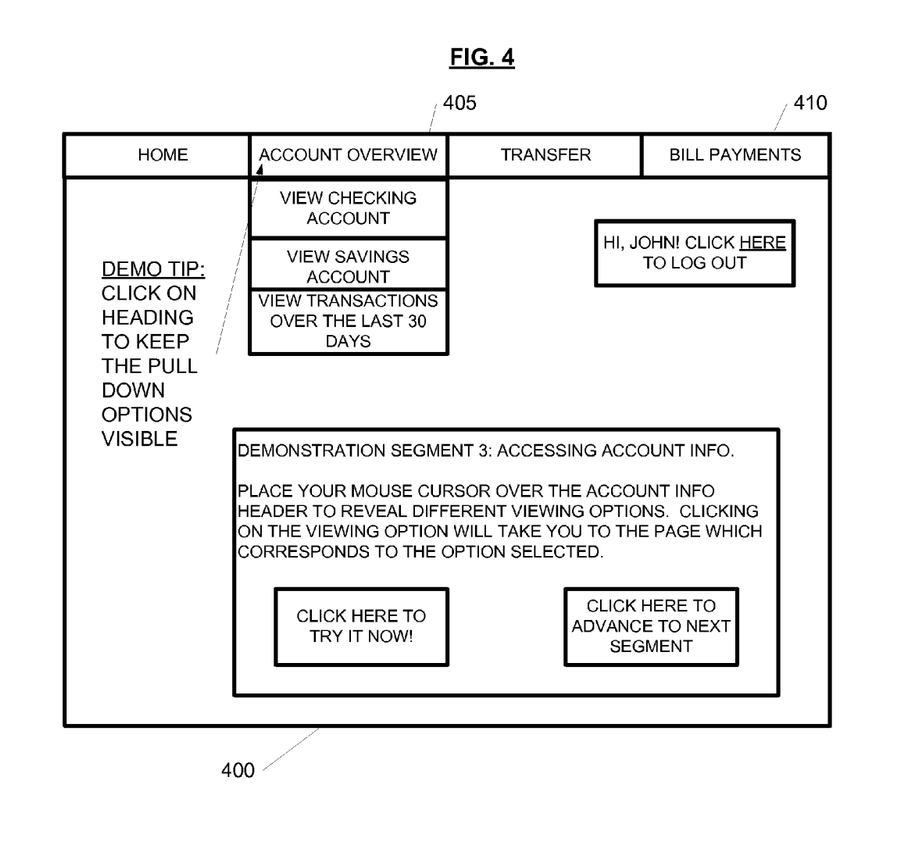
FIG. 4 is an example of an interface which demonstrates the features of an online banking system according to one or more illustrative aspects of the invention.

At step 220, upon logging into the customer's online account for the first time, an application may be launched to assist the customer in learning how to use the online banking system. The launched application may be a demonstration of the various features available to the customer and may direct the customer to follow audio or visual instructions in order to familiarize the customer with the online banking system. FIG. 4 illustrates an example of an interface 400 demonstrating at least one feature of the online banking system. The demonstration may include an overview of a customer's account 405. The demonstration may also include an overview of bill payment functionality 410. In another example, the demonstration may include online customer service (not shown) or an account alert (not shown). The online customer service may include changing the address of the customer, updating the email address associated with the account, phone number directory for bank departments, and the like.

In one aspect, the application may accept input from the customer to aid the customer in familiarizing the customer in retaining what is demonstrated. For example, the application may ask the customer to click on certain links or type in alphanumeric characters at certain locations. In another aspect, the application might not require input from the customer. For example, the application may describe an online banking function and then demonstrate the function with an automated cursor and/or audio instruction without customer input.

Figure 5:
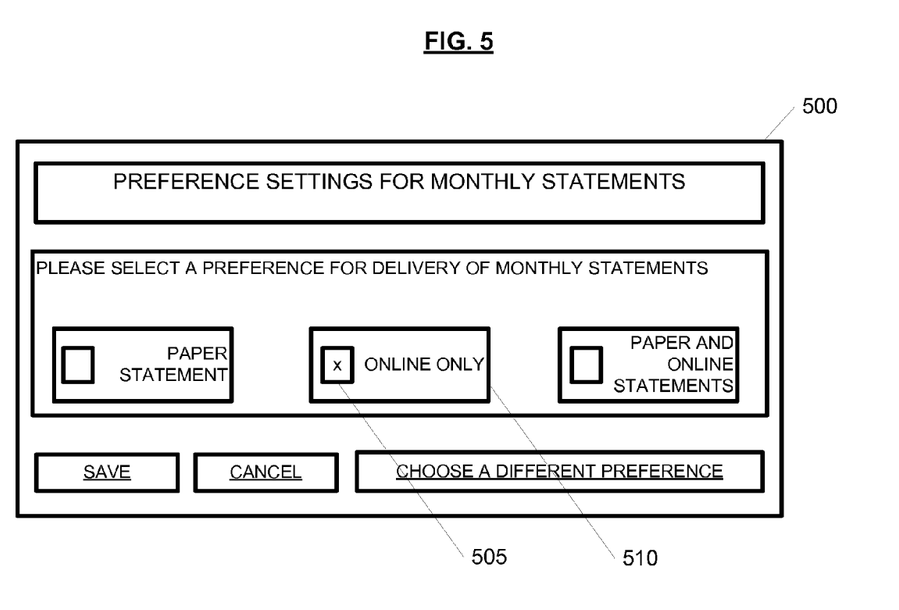
FIG. 5 is an example of an interface which allows a customer to select account preferences according to one or more illustrative aspects of the invention.

Referring back to FIG. 2, at step 225, computer 100 may receive customer input selecting one or more customer preferences for the customer's online banking access. For example, the customer may select to receive all bank statements online. In another example, the customer may select to suppress any future bank statements from being delivered to the customer's mailing address. FIG. 5 is an example of an interface 500 which may accept inputs for customer preference setting. Input may be received, for example, where the customer clicks a selection box 505 within an option box 510.

Referring back to FIG. 2, at step 230, the demonstration may finish and the customer may be logged out of the customer's online banking session at the completion of the online enrollment process.

In one aspect, the demonstration may include an agent may activate the different tabs or links within the online banking service and describing how to use the service included in each tab. For example, the agent may click, mouse-over, or otherwise activate on an accounts overview tab or link and describe to the customer what the account overview may include and how to access those features. Next, the agent may activate a bill payment tab or link and explain how the customer may use the bill payment feature. In another example, the agent may activate on the customer service tab or link and describe which service features may be accessed by the customer if the customer clicks on the customer service tab or link and how to access those features.

In another aspect, where the customer may be enrolling into an online banking system at a branch office with an agent, the demonstration may include pause points when the agent may answer any questions the customer may have or where the customer may further familiarize him or herself with the interface and the options available and may continue the demonstration at the customer's desire. For instance, the pause points may be or comprise a pause button. By pressing on the button, the demonstration may be paused. By pressing a play or continue button, the demonstration may pick up where the demonstration left off and may return to the appropriate interface to resume the demonstration from a different interface. In another aspect, before moving on to the next feature after demonstrating one feature, the demonstration may allow the user to review the segment of the demonstration again. Alternatively, a shortened "quick review" demonstration may be selected or presented to the customer.

In another aspect, the customer may be asked to participate in a quiz as part of the demonstration before logging out of the customer's online banking profile. Alternatively, the quiz may be provided after the demonstration has completed. Such a quiz may be designed, for example, to reinforce what the customer should have learned during the demonstration. In one aspect, successful completion of the quiz may qualify the customer for a prize. For example, the prize may be account related (e.g., a boost in the interest rate for a customer account for a pre-determined period of time) or may be a discount or waiver for certain features accessible to the customer which otherwise may include a fee.

In one aspect, the customer may be allowed to select the particular banking features that the customer may use more frequently. For example, a customer may know in advance or estimate that the customer may typically use online banking for online bill pay or for transferring money from the customer's checking account to the customer's savings account and vice versa. By selecting these options during the demonstration, the demonstration may be focused on those features. For example, the demonstration may demonstrate these features first and review these features at the end. In another aspect, the customer's homepage may be customized based on the features the customer selected. For example, after logging in, instead of being re-directed to a general homepage, the customer may be directed to a page where the customer may make bill payments or may transfer money instead.

Additionally, the customer may be able to set customer account preferences during the demonstration. For example, in demonstrating to the customer which tabs or pages within the graphical interface may allow the customer to set customer preferences, the demonstration may allow the customer to personalize the customer's account and select the different preferences which the customer may desire. Examples of different settings which may be available to the customer during the demonstration may include an option to suppress statements delivered via snail mail to the customer's listed address or to change the frequency that statements are mailed out.

Figure 3:
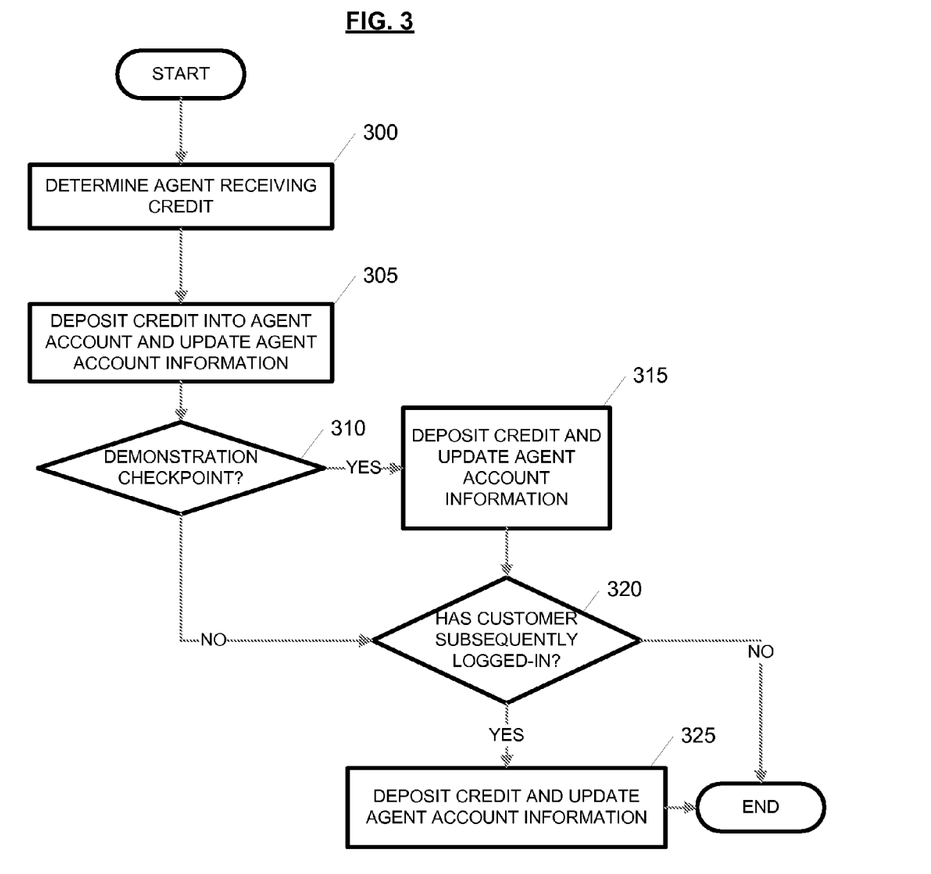
FIG. 3 is a flow chart of an illustrative method of incentive crediting an agent for enrolling a customer into an online banking system.

FIG. 3 illustrates a flowchart illustrating an example of a method of incentive crediting an agent for enrolling a customer into an online banking system. At step 300, upon completion of the creation of a customer's identification name and passcode, computer 100 may determine which agent receives incentive credit for the customer's creation of the identification name and passcode. For example, if the customer creates the identification name and passcode at a particular agent's workstation, information identifying the agent or agent's workstation may be included in the submission of the customer's request for creation of an identification name and passcode without any additional effort by the agent or customer. In another example, a customer referred by a particular agent may include the name or identification information identifying the agent as part of the enrollment process. In another configuration, a customer receiving a text message or email message from an agent, may follow the link and in doing so, may allow computer 100 to identify the agent who sent the link to the customer.

At step 305, computer 100 may deposit incentive credit earned into the agent account and may update the incentive credit earned account information. At step 310, the agent enrolling a customer or referring a customer for enrollment into an online banking system may receive additional incentive credit when the customer reaches a certain segment of a demonstration of the online banking system. For example, the demonstration may request that the agent click on a certain link or otherwise perform an action and the agent may receive additional incentive credit if the customer successfully performs the requested action. Alternatively, if the demonstration reaches a certain segment, the agent may automatically receive the additional incentive credit. Additionally, if the customer completes a post-demonstration quiz during the enrollment session, the agent may receive additional incentive credit based on the quiz score obtained by the customer. At step 315, additional incentive credits earned by the agent may be deposited into the agent's incentive account and the incentive account may be updated accordingly.

Figure 6:
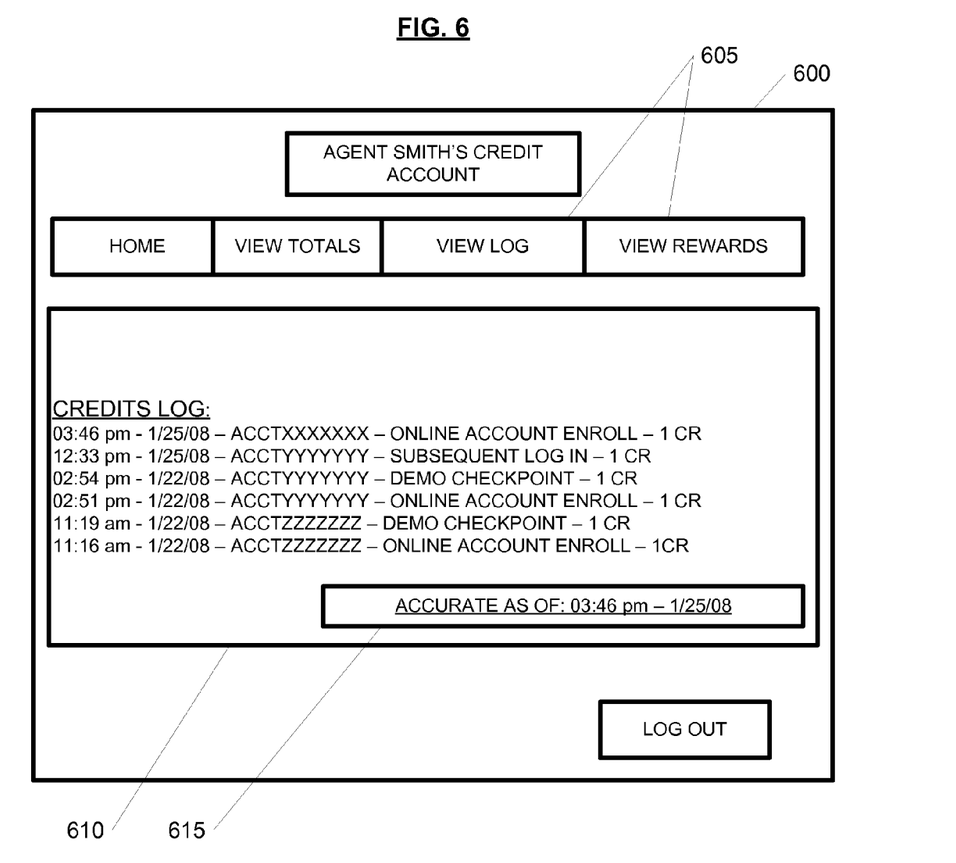
FIG. 6 is an example of an interface which displays an agent incentive credit account according to one or more illustrative aspects of the invention.

At step 320, computer 100 may determine that customer may have logged into the customer's online bank account subsequent to the initial log-in during the customer enrollment session. At step 325, computer 100 may incentive credit the agent incentive credit account with a predefined number of incentive credits and, accordingly, may update the account. In one configuration, 48 hours after computer 100 updates an agent incentive credit account, the agent may view the updated agent incentive credit account to verify that the appropriate number of incentive credits was added to the agent incentive credit account. In another configuration, the incentive credit account may be updated in real-time and immediately after computer 100 updates an agent incentive credit account, the agent may view the updated agent incentive credit account to verify that the appropriate number of incentive credits was added to the agent incentive credit account. FIG. 6 is an example of an interface 600 which displays an agent incentive credit account. After the agent logs into the agent's incentive credit account, the agent may view different aspects of the account by selecting the corresponding header 605. FIG. 6 displays an example of an incentive credit log 610 for an agent. The incentive credit log may display all incentive credits earned in the last week and the time of earning. Additionally, the incentive credit log may display an accuracy bar 615 which indicates when the last update to the incentive credit account was made.

In one aspect, the method of enrolling a customer into an online bank account and the method of incentive crediting an agent for enrolling a customer into an online banking system may be combined.

In another aspect, the entire enrollment process may be web-based. For example, the agent may walk a customer through the entire enrollment process from the agent workstation by visiting an internal website. In another example, the customer may be able to begin and complete the entire enrollment process by visiting the financial institution's website.

Aspects described herein are contemplated to be applicable for use by any type service or product provider. Service providers may include banks, mobile service providers, and the like. Product providers may be product manufacturers or product distributors.

While illustrative embodiments described herein embody various aspects are shown, it will be understood by those skilled in the art that the invention is not limited to these embodiments. Modifications may be made by those skilled in the art, particularly in light of the foregoing teachings. For example each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

We claim:

1. A method comprising:
receiving customer enrollment information for creating an online banking profile;
receiving a requested customer identification name and a requested passcode;
determining whether the requested customer identification name is available; upon determining that the requested customer identification name is available, creating the online banking profile based on the received customer enrollment information, setting a login identification for the online banking profile to the requested customer identification name, and setting a login passcode for the online banking profile to the requested passcode;
when a customer of online banking is logged into the online banking profile, initiating, by a computing device, a demonstration of one or more features available to the customer and receiving at least one account preference during the demonstration; and
during the demonstration, setting customer account preferences of the online banking profile according to the received at least one account preference.

2. The method of claim 1 wherein the demonstration includes at least one of: an overview of a customer account, an overview of bill payment functionality, online customer service, and account alerts.

3. The method of claim 1 wherein the demonstration includes first and second customer interactive content, wherein the first customer interactive content results in the received one or more customer account preferences.

4. The method of claim 3 wherein the demonstration includes audio and visual components.

5. The method of claim 1 wherein all the steps are completed during a customer enrollment session.

6. The method of claim 1 further comprising:
during the demonstration, setting a selected homepage for the online banking profile according to input received during the demonstration.

7. The method of claim 6, wherein the selected homepage is displayed upon the customer logging into the online banking profile.

8. The method of claim 1 wherein the demonstration includes a quiz having questions related to content of the demonstration.

9. A method comprising:
receiving customer account information for creating an online banking profile from an agent;
receiving a requested customer identification name and a requested passcode;
determining whether the requested customer identification name is available;
upon determining that the requested customer identification name is available, creating the online banking profile based on the received customer account information, setting a login identification for the online banking profile to the requested customer identification, setting a login passcode for the online banking profile to the requested passcode, and depositing a first number of incentive credits into an agent incentive credit account of the agent based on the creating of the online banking profile;
when a customer of online banking is logged into the online banking profile, initiating, by a computing device, a demonstration of one or more features available to the customer and receiving at least one account preference during the demonstration;
during the demonstration, setting customer account preferences of the online banking profile according to the received at least one account preference; and
upon completion of the demonstration, depositing a second number of incentive credits into the agent incentive credit account of the agent based on the demonstration.

10. The method of claim 9 wherein depositing the first number of incentive credits into the agent incentive credit account includes:
identifying the agent incentive credit account based on information received from the agent;
identifying the first number of incentive credits to be deposited into the agent incentive credit account of the agent; and depositing the first number of incentive credits into the agent incentive credit account of the agent prior to logging the customer into the online banking profile, wherein the customer is logged into the online banking profile prior to the demonstration.

11. The method of claim 9 wherein depositing the first number of incentive credits into the agent incentive credit account of the agent is based on a successful creation of the online banking profile.

12. The method of claim 9 wherein the second number of incentive credits is deposited into the agent incentive credit account of the agent upon the customer logging out of the online banking profile, wherein the customer is logged into the online banking profile prior to the demonstration.

13. One or more non-transitory computer readable media storing computer executable instructions that, when executed, cause a computing device to: receive customer account information for creating an online banking profile; receive a requested customer identification name and a requested passcode; determine whether the requested customer identification name is available; upon determining that the requested identification name is available, create the online banking profile based on the received customer account information, setting a login identification for the online banking profile to the requested customer identification, and setting a login passcode for the online banking profile to the requested passcode;

when a customer is logged into the online banking profile, initiate a demonstration of one or more features available to the customer and receive at least one account preference during the demonstration; and     during the demonstration, set customer account preferences of the online banking profile according to the received at least one account preference.

14. The one or more non-transitory computer readable media of claim 13 wherein the demonstration includes at least one of the following: an overview of the customer account, an overview of bill payment functionality, online customer service, and account alerts.

15. The one or more non-transitory computer readable media of claim 13 wherein the demonstration includes first and second customer interactive content, wherein the first customer interactive content results in the received one or more customer account preferences.

16. The one or more non-transitory computer readable media of claim 15 wherein the demonstration includes audio and visual components.

17. The one or more non-transitory computer readable media of claim 13 wherein all steps are completed during a customer enrollment session.

18. One or more non-transitory computer readable media storing computer executable instructions that, when executed, cause a computing device to:

receive customer account information for creating an online banking profile from an agent;

receive a requested customer identification name and a requested passcode; determine whether the requested customer identification name is available; upon determining that the requested identification name is available, create the online banking profile based on to the received customer account information, a login identification for the online banking profile to the requested customer identification, set a login passcode for the online banking profile to the requested passcode, and deposit a first number of incentive credits into an agent incentive credit account of the agent based on the creating of the online banking profile;

when a customer is logged into the online banking profile, initiate a demonstration of one or more features available to the customer and receive at least one account preference during the demonstration;

during the demonstration, set customer account preferences of the online banking profile according to the received at least one account preference; and     upon completion of the demonstration, deposit a second number of incentive credits into the agent incentive credit account of the agent based on the demonstration.

19. The one or more non-transitory computer readable media of claim 18 wherein depositing the first predetermined number of incentive credits into the agent incentive credit account includes:

identifying the agent incentive credit account based on information received from the agent;

identifying the first number of incentive credits to be deposited into the agent incentive credit account of the agent; and     depositing the first number of incentive credits into the agent incentive credit account of the agent prior to logging the customer into the online banking session, wherein the customer is logged into the online banking profile prior to the demonstration.

20. The one or more non-transitory computer readable media of claim 18 wherein depositing the first number of incentive credits into the agent incentive credit account of the agent is based on a successful creation of the online banking profile.

21. The one or more non-transitory computer readable media of claim 18 wherein the second number of incentive credits is deposited into the agent incentive credit account of the agent upon the customer logging out of the online banking profile, wherein the customer is logged into the online banking profile prior to the demonstration.

* * * * *